(12) United States Patent
Yamada (10) Patent No.: US 9,446,771 B2
(45) Date of Patent: *Sep. 20, 2016

(54) DRIVE MODE SELECTOR

(71) Applicant: Honda Motor Co., Ltd., Minato-ku, Tokyo (JP)

(72) Inventor: Hajime Yamada, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/640,396

(22) Filed: Mar. 6, 2015

(65) Prior Publication Data

US 2015/0175171 A1    Jun. 25, 2015

Related U.S. Application Data

(63) Continuation of application No. 13/752,845, filed on Jan. 29, 2013, now Pat. No. 9,007,199.

(51) Int. Cl.
*B60Q 1/00* (2006.01)
*B60W 50/08* (2012.01)
(Continued)

(52) U.S. Cl.
CPC ............ *B60W 50/082* (2013.01); *B60K 37/06* (2013.01); *G07C 5/00* (2013.01); *B60K 2350/102* (2013.01); *B60K 2350/2039* (2013.01); *B60K 2350/925* (2013.01); *B60W 2050/146* (2013.01)

(58) Field of Classification Search
CPC .................... B60W 50/082; B60W 2050/146; B60K 37/06; B60K 2350/2039; B60K 2350/925; B60K 2350/102; G07C 5/00

USPC ............ 340/438, 439, 459, 461, 456, 425.5, 340/905; 116/28.1; 701/1; 180/197
See application file for complete search history.

(56) References Cited

U.S. PATENT DOCUMENTS

| 5,563,622 A | 10/1996 | Person et al. |
| 5,696,483 A | 12/1997 | Khalid et al. |

(Continued)

FOREIGN PATENT DOCUMENTS

| CN | 1840943 A | 10/2006 |
| DE | 19907795 A1 | 9/2000 |

(Continued)

OTHER PUBLICATIONS

Chinese Office Action issued Dec. 1, 2015 for Chinese Patent Application No. 201410041055.7, with English translation.

(Continued)

*Primary Examiner* — Anh V La
(74) *Attorney, Agent, or Firm* — Arent Fox LLP (57) ABSTRACT

A drive mode selection system for a vehicle is provided that includes a drive mode selector that can facilitate selection of a current drive mode from among a plurality of drive modes of the vehicle based at least in part on input from a driver of the vehicle. Each of the plurality of drive modes can be associated with a distinct visual indicator. Additionally, the system can include a mode indication component that can display the current drive mode of the plurality of drive modes by providing the distinct visual indicator associated with the current drive mode. The system can further include a mode recommendation component that can recommend a drive mode of the plurality of drive modes based at least in part on the current drive mode and data received from one or more sensors.

18 Claims, 5 Drawing Sheets

(51) Int. Cl.
  *G07C 5/00* (2006.01)
  *B60K 37/06* (2006.01)
  *B60W 50/14* (2012.01)

(56) References Cited

U.S. PATENT DOCUMENTS

| | | |
|---|---|---|
| 6,987,508 B2 | 1/2006 | Numata |
| 7,327,241 B2 | 2/2008 | Toda et al. |
| 7,349,776 B2 | 3/2008 | Spillane et al. |
| 7,847,680 B2 | 12/2010 | Gencyuz et al. |
| 8,175,785 B2 | 5/2012 | Turski |
| 9,007,199 B2 * | 4/2015 | Yamada .......... G07C 5/00 340/438 |
| 2003/0234764 A1 | 12/2003 | Noguchi et al. |
| 2009/0146798 A1 | 6/2009 | Gencyuz et al. |
| 2010/0049408 A1 | 2/2010 | Abadie et al. |
| 2010/0161188 A1 | 6/2010 | Turski et al. |
| 2011/0025488 A1 | 2/2011 | Leon |
| 2011/0037582 A1 | 2/2011 | Wu |
| 2012/0293317 A1 | 11/2012 | Hanna et al. |

FOREIGN PATENT DOCUMENTS

| | | |
|---|---|---|
| DE | 102010039675 A1 | 3/2012 |
| DE | 112004001545 B4 | 10/2012 |
| FR | 2010037947 A1 | 4/2010 |
| JP | 2007302055 A | 11/2007 |
| JP | 2011010722 A1 | 1/2011 |

OTHER PUBLICATIONS

German Search Report for DE 10 2014 201 075.6, Mar. 20, 2015.

* cited by examiner

DRIVE MODE SELECTOR

CROSS-REFERENCE TO RELATED APPLICATIONS

This application is a continuation of, and claims priority to, U.S. patent application Ser. No. 13/752,845, filed Jan. 29, 2013, and entitled "DRIVE MODE SELECTOR", the entirety of which is incorporated herein by reference.

ORIGIN

This disclosure relates to a selector device for a vehicle and more specifically, to a drive mode selector and drive mode selector indicator for a vehicle.

BACKGROUND

Some vehicles having automatic transmissions include controls to select between one of a number of drive modes. Typically, modes are associated with a vehicle depending on usage of a vehicle. These different drive modes can correspond to different gear ratios, such as ones designed for driving in various conditions (e.g., highway driving, driving during inclement weather, etc.). For example, normal and comfort modes are often part of a gear ratio. In other situations, drive modes can control other aspects of a vehicle, such as the extent of use of gas versus electric in a hybrid vehicle, or can affect steering responsiveness or feel.

A visual indicator can indicate a current drive mode. However, depending on the nature of the indicator, this can be distracting to the driver, and can cause attention to be drawn away from the road and any potential hazards that can be present.

SUMMARY

The following presents a simplified summary of the disclosure in order to provide a basic understanding of some aspects of the disclosure. This summary is not an extensive overview of the disclosure. It is not intended to identify key/critical elements of the disclosure or to delineate the scope of the disclosure. Its sole purpose is to present some concepts of the disclosure in a simplified form as a prelude to the more detailed description that is presented later.

The disclosure provides a drive mode selection system for a vehicle that includes a drive mode selector that can facilitate selection of a current drive mode from among a plurality of drive modes of the vehicle based at least in part on input from a driver of the vehicle. Each of the plurality of drive modes can be associated with a distinct visual indicator. Additionally, the system can include a mode indication component that can display the current drive mode of the plurality of drive modes by providing the distinct visual indicator associated with the current drive mode.

In another aspect, the disclosure provides a drive mode selection method that can include the acts of changing a first drive mode associated with a vehicle to a second drive mode based at least in part on a selection received from a driver and providing one or more indicators associated with the second drive mode to the driver, wherein the one or more indicators comprise a first visual indicator. Additionally, the method can include the act of reducing a brightness of the first visual indicator from a first intensity to a second intensity.

In yet another aspect thereof, the disclosure provides a system configured to display a current drive mode of a vehicle that can include a mode indication component that can display a first visual indicator associated with the current drive mode and a second visual indicator associated with the current drive mode. At least one of the first visual indicator and the second visual indicator can be on a dashboard of, or otherwise displayed within (e.g., heads-up display (HUD)), the vehicle. Additionally, the system can include a mode recommendation component that receives data from one or more sensors. The mode recommendation component can determine a recommended drive mode based at least in part on the received data and the current drive mode, and the mode indication component can display a visual indicator associated with the recommended drive mode.

To the accomplishment of the foregoing and related ends, certain illustrative aspects of the disclosure are described herein in connection with the following description and the annexed drawings. These aspects are indicative, however, of but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

DETAILED DESCRIPTION

The disclosure is now described with reference to the drawings, wherein like reference numerals are used to refer to like elements throughout. In the following description, for purposes of explanation, numerous specific details are set forth in order to provide a thorough understanding of the subject disclosure. It can be evident, however, that the disclosure can be practiced without these specific details. In other instances, well-known structures and devices are shown in block diagram form in order to facilitate describing the disclosure.

While, for purposes of simplicity of explanation, the one or more methodologies shown herein, e.g., in the form of a flow chart, are shown and described as a series of acts, it is to be understood and appreciated that the subject disclosure is not limited by the order of acts, as some acts can, in accordance with the disclosure, occur in a different order and/or concurrently with other acts from that shown and described herein. Moreover, not all illustrated acts can be required to implement a methodology in accordance with the disclosure.

The disclosure described herein discloses a system and method of changing between a plurality of drive modes of a vehicle, and of indicating one or more drive modes, such as indicating a currently selected drive mode or indicating a recommended or suggested drive mode. A drive mode selector can facilitate selection of the plurality of drive modes. An indicator can be provided adjacent to the drive mode selector showing a current drive mode. Additionally or alternatively, an indicator can be provided on a dashboard of the vehicle indicating the current drive mode. In aspects, an indicator associated with a suggested drive mode can be provided in certain situations (e.g., if snow is detected, a snow mode can be suggested, etc.).

Figure 1:
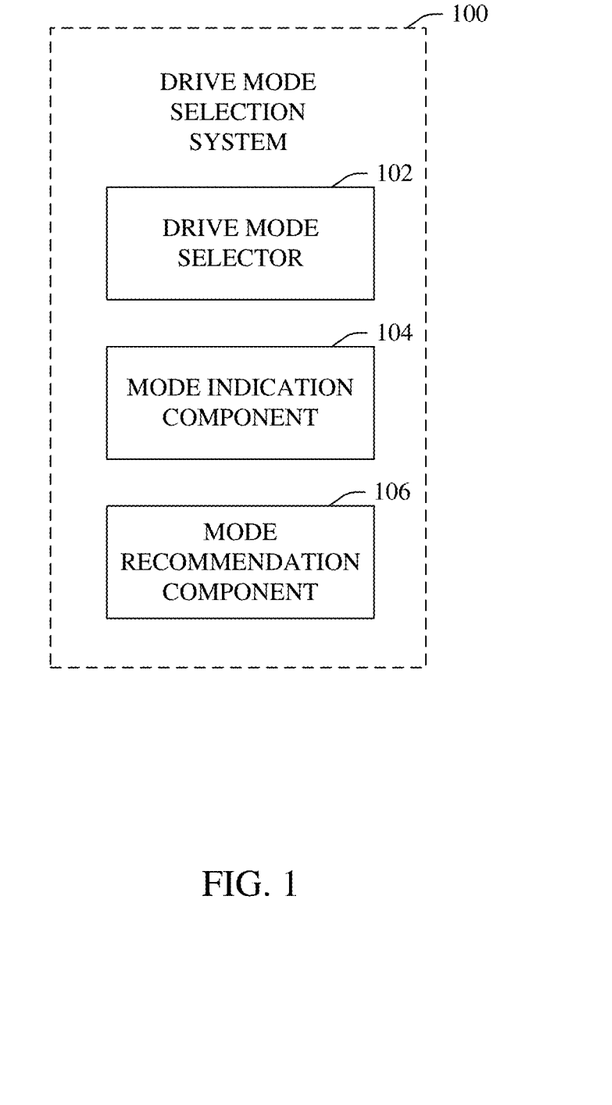
FIG. 1 is a block diagram illustration of a drive mode selection system in accordance with an aspect of the disclosure.

Referring now to the drawings, FIG. 1 is an illustration of a drive mode selection system 100 for an automotive vehicle incorporating the novel features described below in accordance with an aspect of the disclosure. The drive mode selection system 100 can include a drive mode selector 102, a mode indication component 104, and an optional mode recommendation component 106.

The drive mode selector 102 is configured to allow an operator of the vehicle to change between a plurality of drive modes of the vehicle. These drive modes can differ through the use of disparate gear ratios, for example, normal, comfort, and sport drive modes, and can include a drive mode that can provide for better traction and handling in inclement weather, such as a snow mode. Differences between drive modes can include, for example, which gears are used or not used (e.g., only using lower gears, avoiding first gear, etc.), and at when gear shifting occurs (e.g., different threshold revolutions per minute (RPMs) can be used in different drive modes, etc.). In other aspects, the drive modes can alter other characteristics of a driving experience, such as by varying levels of electric motor use in a hybrid vehicle, varying levels of power steering responsiveness, engine performance, etc. The drive mode selector can allow a driver to switch between drive modes in response to changing driving conditions. The interface through which the driver changes drive modes via selector 102 can be any of a variety of interfaces, for example, a mechanical interface such as that shown in connection with the example illustrated in FIGS. 2-4 below (e.g., a knob, dial, lever, slider, one or more buttons, switches, etc.). In yet another embodiment, the drive mode selector 102 can include a touch system that can have a touch pad or screen, where the operator simply touches the pad or screen to shift between drive modes. Further, the touch system can be configured such that the operator simply touches an indicator that corresponds to a drive mode in order to change to that drive mode. In still yet another embodiment, the drive mode selector 102 can include a voice actuated system that communicates with a vehicle's on board computer such that the operator simply uses voice commands to change between drive modes. As well, combinations can exist as desired.

For one or more specialized modes (for example, a snow mode or other mode that is only used in certain situations, etc.), selection of those one or more drive modes can optionally include a different manner of selection (or one or more additional actions) than that used for other modes (e.g., non-specialized modes), so as to avoid inadvertent or unintentional selection of the one or more specialized modes. For example, selecting a snow mode with a knob can include pushing the knob downward to enter snow mode, a touch screen interface could include a confirmation upon selection or locate such an option away from other modes so as to avoid inadvertent selection, a voice interface could include verbal confirmation, etc. While in such a specialized mode, e.g., snow mode, other drive modes can be selected without including the different manner of selection or additional actions.

The mode indication component 104 is configured to provide the driver one or more indicators corresponding to the current drive mode set via the drive mode selector 102. The mode indication component 104 can provide a visual indicator adjacent to (nearby or otherwise located) drive mode selector 102 indicating the current drive mode. In the event a new drive mode is selected, information associated with the selection can be received at the mode indication component 104, and a visual indicator associated with the new drive mode can be illuminated at a first intensity before being reduced to a lesser second intensity. Additionally, a visual indicator can be provided on a dashboard, HUD, etc. of the vehicle so as to indicate the current drive mode in a location less likely to distract a driver's attention from the road. Optionally, in aspects, an auditory indicator can also be provided, such as a tone indicating that the drive mode has changed, a generated voice indicating the name of a current drive mode upon a change, etc.

The mode recommendation component 106 can receive data from one or more sensors associated with the vehicle and determine whether the current drive mode should be altered. This determination can be based on the received data and the current drive mode. For example, if snow is detected (e.g., via sensors detecting temperature, traction, etc.), a snow mode can be recommended by mode recommendation component 106, and an indication of the recommended mode can be provided via mode indication component 104 (e.g., via a visual or auditory indicator, such as a symbol associated with the recommended drive mode, which can be blinking, etc.). In another example, if rain is detected and the vehicle is in a sport mode, a recommendation can be provided to change drive modes. Alternatively, if the vehicle is in a less fuel efficient mode such as a sport mode and frequent stopping or deceleration is detected (e.g., as a result of high traffic, frequent stoplights, etc.), a more fuel efficient mode can be recommended. For specialized modes that require a different manner of selection (or additional actions, etc.), the visual and/or auditory indicator(s) provided by mode indication component 104 can include instructional information showing or telling how to activate the specialized mode.

Figure 2:
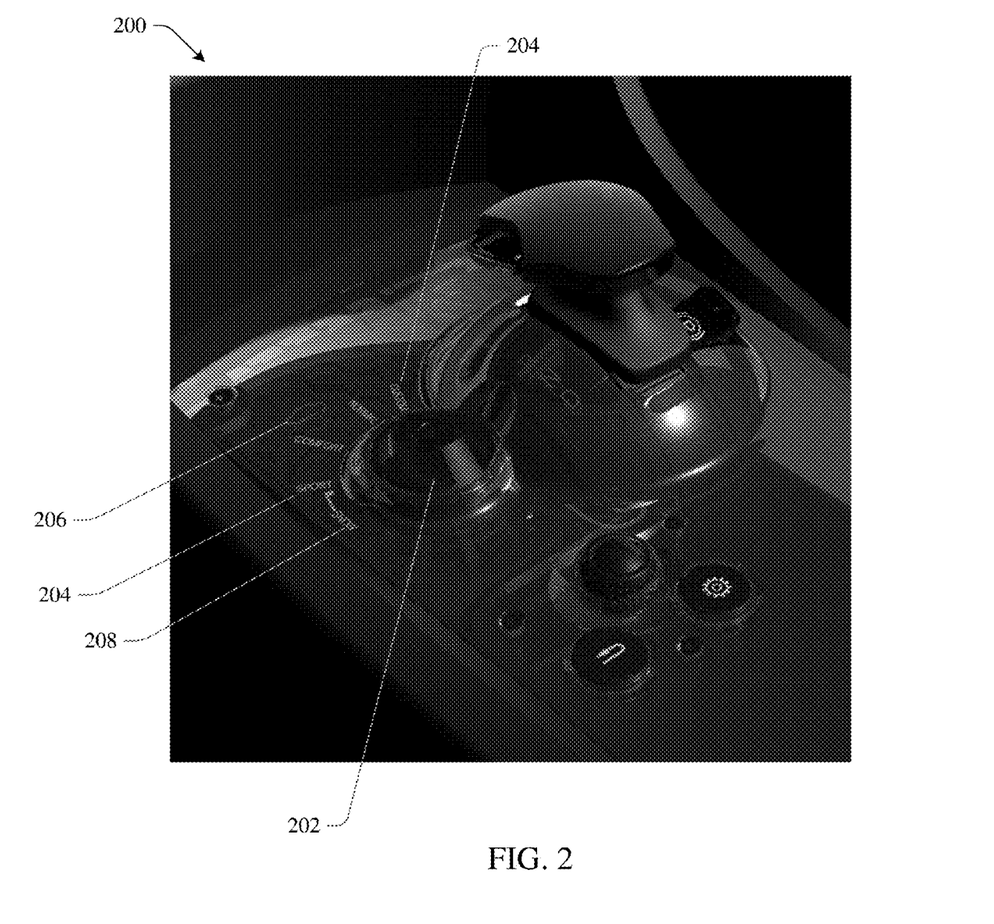
FIG. 2 is a perspective view of one example of a drive mode selection system in accordance with an aspect of the disclosure.
Figure 3:
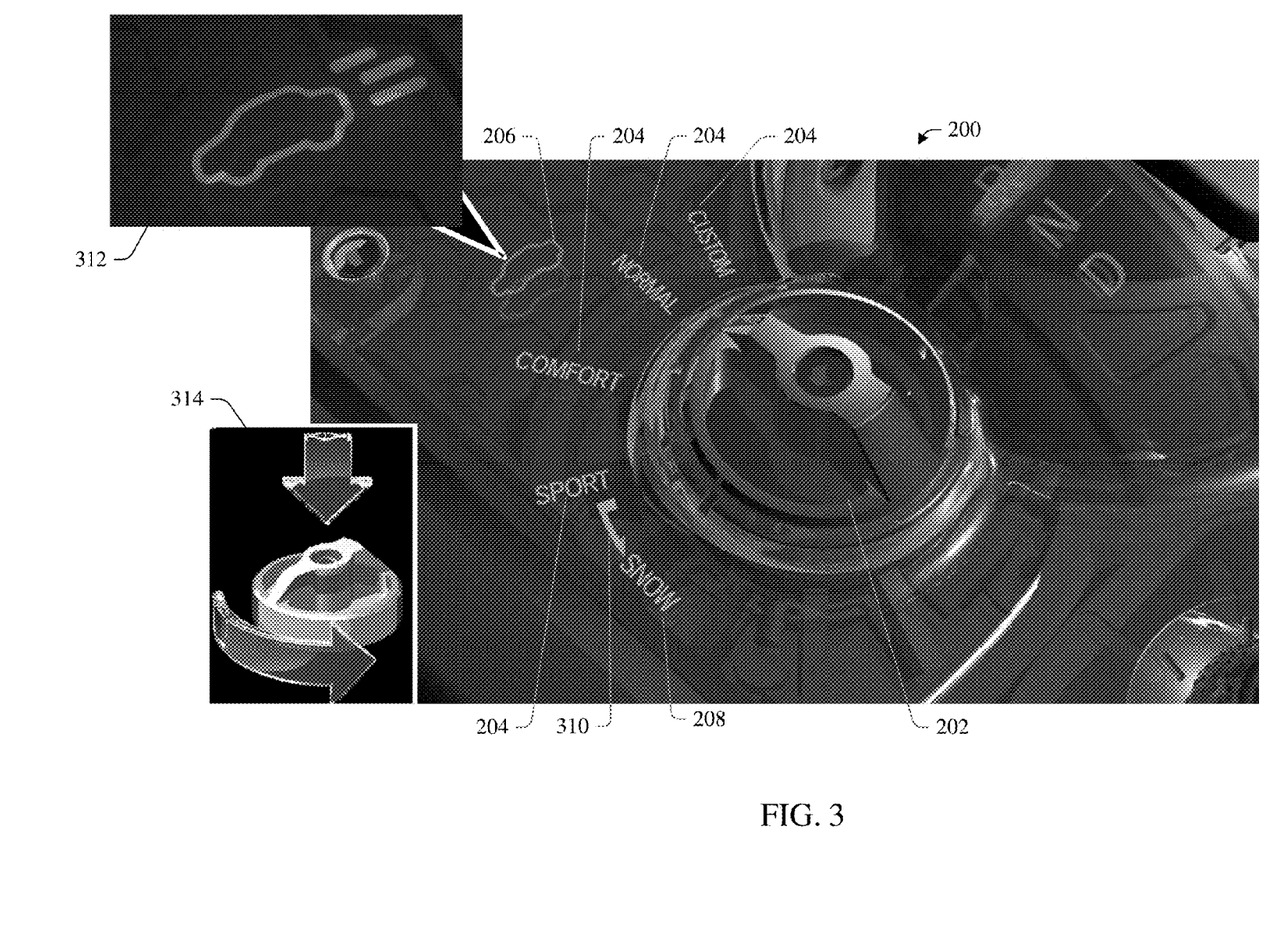
FIG. 3 is a close-up perspective view of the example drive mode selection system of FIG. 2, illustrating various aspects of the disclosure.
Figure 4:
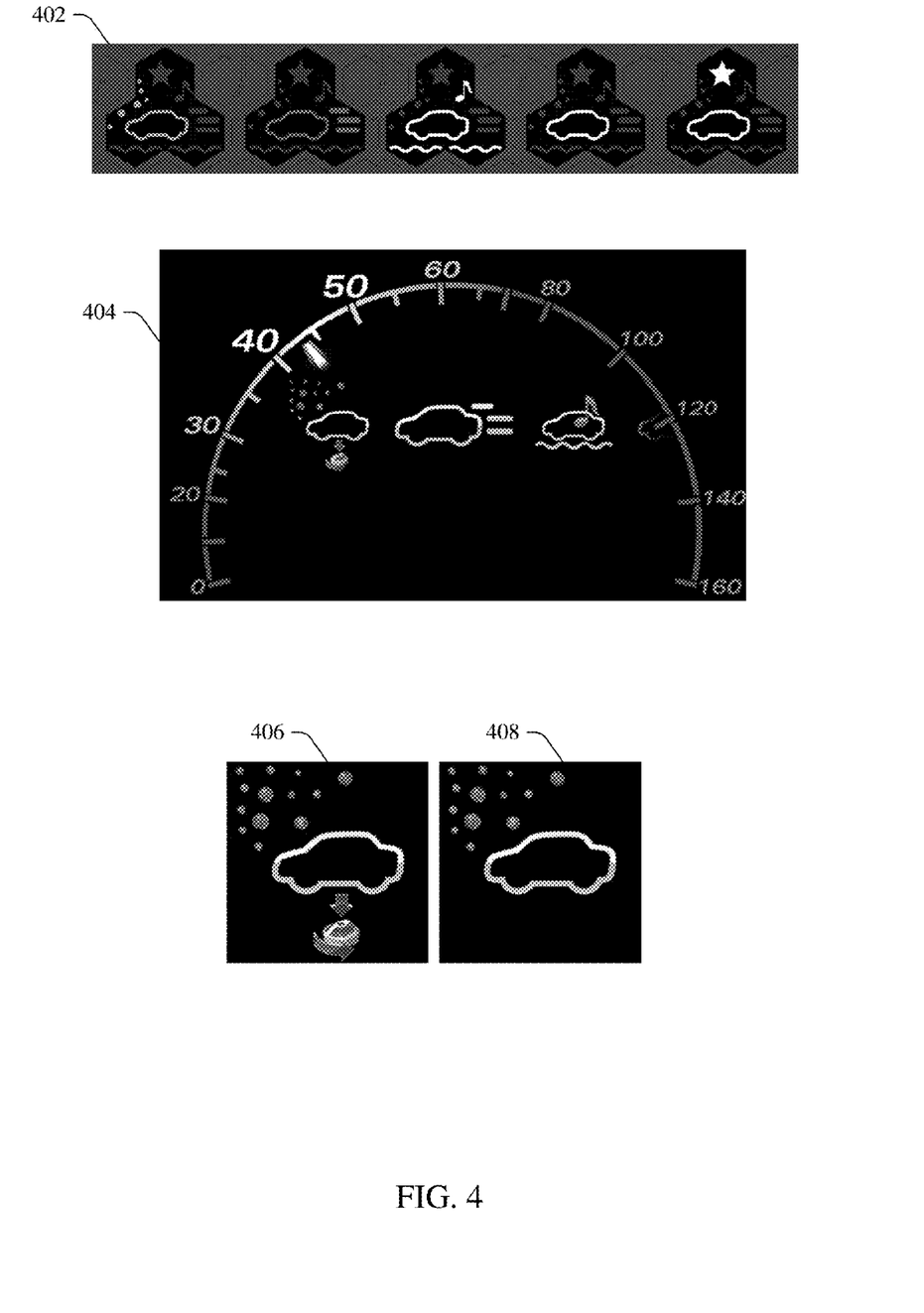
FIG. 4 illustrates a variety of indicator options in accordance with aspects of the disclosure.

FIGS. 2-4 illustrate an example embodiment of a drive mode selection system 200 for a vehicle in accordance with an aspect of the disclosure. Referring specifically to FIG. 2, the drive mode selection system 200 can include an interface such as dial button 202 for selection of a drive mode, such as the knob shown in FIG. 2. It is to be understood that dial button 202 is just one example of a drive mode selector in accordance with the disclosure. Depending on the setting, most any of a plurality of drive modes can be selected, such as those indicated at 204. A visual indicator 206 (e.g., illuminated by a light emitting diode (LED) or other light source) can be provided adjacent to the interface (e.g., dial 202) to show a currently selected drive mode. Through the dial button 202, a number of different modes 204 can be selected by turning the dial to the corresponding position. A snow mode 208 can be provided as one of the drive modes 204, which, in the example shown, can be selected by pressing down on the dial and turning it. The snow mode can be used so that gears associated with traction in snow can be implemented.

When a mode is selected, the drive mode indicator can light up to show the setting. The indicator can initially brighten up at the beginning of a selection and can then dim or fade out, for example by providing the indicator at a first intensity for a first time period, and reducing from the first intensity to a lesser second intensity over a second time period. In aspects, each of the first intensity, the second intensity, the first time period, and the second time period can be pre-set (e.g., the second intensity could be half of the first intensity, or more or less) or can be customizable by a driver. Other aspects can also be customizable, such as colors used in indicators, time delays associated with changes in intensity, gear ratios used in one or more custom drive modes (or extent of use of gas versus electric in a hybrid vehicle drive mode, etc.), etc.

In the example shown in FIG. 2, the drive mode indicator 206 can be provided within the center console. When more than three modes are provided, however, the use of the dial can be distracting to the driver. In aspects, the drive mode indicators can be displayed within the driver's dashboard alternatively or additionally (as well is via an HUD, etc.). For example, although not shown in FIG. 2, a separate visual indicator can also be provided on the dashboard of the vehicle. Recommended drive modes can also be displayed in the dashboard where they will be more readily seen by a driver. For example, for a snow mode, the dial button 202 (or other indicator, depending on the particular embodiment of the drive mode selector) can be displayed within the dashboard. When snow is detected, the snow mode can automatically be displayed to recommend selection of snow mode to the driver.

The drive mode selection system illustrated in FIG. 2 and its location and arrangement within the vehicle is but one example configuration adapted to conform to the drive mode selection system 100 described above and illustrated in FIG. 1. Thus, it is to be understood that the example embodiment described herein and illustrated in FIGS. 2-4 is for illustrative purposes only and is not intended to limit the scope of the disclosure.

Referring to FIG. 3, a close-up of the example drive mode selection system 200 can be seen, showing the dial button 202, example drive modes 204, visual indicator 206, and snow mode 208. One or more instructional signs showing how to select modes requiring additional or different actions to select can also be included, such as at 310. At 312 is shown an example drive mode indicator that can be shown via visual indicator 206, showing a sign associated with a sport mode. Each of the plurality of drive modes can be associated with a different drive mode indicator such as indicator 312. At 314 is an example indicator showing how to activate a specialized drive mode such as snow mode; an indicator such as that shown at 314 can be provided on the dashboard when snow mode is recommended. It is to be understood that for interfaces other than dial button 202, a different indicator than that of 314 can be shown indicating the appropriate actions required to select the specialized mode.

Referring to FIG. 4, shown is a plurality of visual indicators associated with the example drive mode selection system of FIG. 2. At 402 is a plurality of drive mode indicators that can be shown by drive mode indicator 206, corresponding to the drive modes snow, sport, comfort, normal, and custom shown in FIGS. 2 and 3. It is to be understood that these indicators are merely examples and variations on them (e.g., color, indicia, etc.) can also be used, as can other marks to indicate drive modes, provided that each drive mode is associated with a unique, different or distinct sign, mark or indicator from the other drive modes. Additionally, drivers can be provided with the ability to customize indicators used in connection with drive modes.

At 404 is an example of visual indicators that can be displayed on a dashboard to indicate a current or recommended drive mode, shown here in the center of the speedometer (although in various embodiments, a dashboard indicator can be provided in alternate locations). At 406 is an indicator that can be used in connection with recommending a snow mode, showing instructional information as to how to select snow mode. In contrast, indicator 408 can be used to indicate that snow mode is the currently selected mode, as the instructional information is not required when snow mode is currently selected. Again, it is to be understood that the indicators shown herein are only examples, and that additional or alternative indicators can be used without departing from the spirit and scope of this disclosure.

It is to be understood that the indicators shown herein can be configured to provide an illumination in a different color based on operator choice, whereby the operator provides a color input to the vehicle's on board computer, actuates a button or switch, etc. In other words, the operator can customize or personalize a different color for each drive mode. In addition, the operator can change the color of one of more gears at intervals (e.g., from day-to-day, week-to-week, etc.), and can customize the first intensity, second intensity, and time periods associated with the first intensity and second intensity (e.g., a first time period to display the first intensity, a second time period over which the intensity decreases from the first intensity to the second intensity, etc.), customize auditory indicators (e.g., volume, selecting a voice for embodiments that provide a voice indication of a selected drive mode, etc.), etc.

Figure 5:
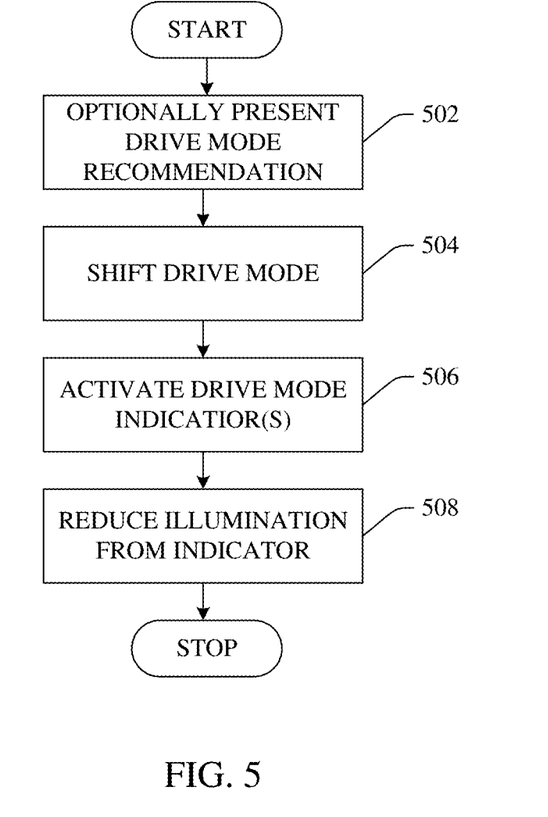
FIG. 5 is a flow chart diagram illustrating a method of providing for indication of and selection of drive modes in accordance with an aspect of the disclosure.

Referring to FIG. 5, a method of providing for drive mode selection in a vehicle will now be described in accordance with an aspect of the disclosure. Optionally, at 502, a drive mode recommendation can be made, based at least in part on input received from one or more sensors and on a current drive mode. For example, if snow is detected and the vehicle is not currently in snow mode, a recommendation can be provided to the driver that snow mode should be selected. This recommendation can be provided, for example, displayed on a dashboard or HUD of the vehicle. In aspects, an auditory indicator can also be used, such as a beep or alarm sound indicating that a different drive mode than the current mode is recommended, or a simulated voice can recommend a drive mode, etc. At 504, the current drive mode can be changed to a new drive mode based on input received from the driver such as through a drive mode selector 102 (e.g., a dial button 202, voice command, touch screen, etc.). At 506, one or more drive mode indicators associated with the new drive mode can be provided to the driver. These indicators can include one or more visual indicators (e.g., adjacent to the drive mode selector, on the dashboard, etc.), auditory indicators, voice indicators, etc. At least one of the visual indicators can be displayed at a first intensity. At 508, the brightness of the illumination from the at least one of the visual indicators can be reduced from the first intensity to the second intensity.

As mentioned above, the disclosure discloses a system and method that can facilitate changing drive modes and providing indicators of current and optionally recommended drive modes. As described herein, visual indicators can be provided both adjacent to a drive mode selector and on a dashboard, which can reduce driver distraction. Auditory indicators can also be used.

What has been described above includes examples of the disclosure. It is, of course, not possible to describe every conceivable combination of components or methodologies for purposes of describing the subject disclosure, but one of ordinary skill in the art can recognize that many further combinations and permutations of the disclosure are possible. Accordingly, the disclosure is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A drive mode selection system for a vehicle, comprising:
   a drive mode selector that facilitates selection of a first drive mode from a plurality of drive modes of the vehicle;
   a mode indication component that displays an indication of the first drive mode as a visual indicator that is different than other visual indicators associated with other drive modes of the plurality of drive modes; and
   a mode recommendation component that recommends a second drive mode from the plurality of drive modes based on the first drive mode and data received from at least one sensor.

2. The drive mode selection system of claim 1, wherein the drive mode selector facilitates a change from the first drive mode to the second drive mode or to a third drive mode selected from the plurality of drive modes.

3. The drive mode selection system of claim 1, wherein the plurality of drive modes comprise at least one specialized mode, and wherein a selection of the at least one specialized mode comprises a different manner of selection than the manner of selection used for a nonspecialized mode.

4. The drive mode selection system of claim 1, wherein the plurality of drive modes comprise at least one specialized mode, and wherein a selection of the at least one specialized mode comprises a specific input in addition to an input used for the selection of a non-specialized mode.

5. The drive mode selection system of claim 1, wherein the mode indication component displays the visual indicator on a vehicle dashboard.

6. The drive mode selection system of claim 1, wherein the mode indication component displays the visual indication adjacent the drive mode selector.

7. The drive mode selection system of claim 1, wherein the mode indication component displays the visual indication on a heads up display.

8. The drive mode selection system of claim 1, wherein the visual indicator is customized based at least in part on an input received from an operator of the vehicle.

9. The drive mode selection system of claim 1, wherein the mode indication component outputs an auditory indicator that confirms the selection of the first drive mode.

10. A drive mode selection method for selecting a drive mode for a vehicle, comprising:
    determining an operation of the vehicle is based on a first drive mode;
    displaying an indication of the first drive mode as a visual indicator that is different than other visual indicators associated with other drive modes of a plurality of drive modes;
    providing a recommendation to change the operation of the vehicle from the first drive mode to a second drive mode based on data received from at least one sensor and the first drive mode; and
    changing the operation of the vehicle from the first drive mode to the second drive mode based on a determination that the recommendation is approved.

11. The drive mode selection method of claim 10, wherein the providing the recommendation comprises determining the second drive mode based on an indication of a weather condition, wherein the indication is included in the data received from the at least one sensor.

12. The drive mode selection method of claim 10, wherein the providing the recommendation comprises outputting a visual indicator that indicates the recommendation.

13. The drive mode selection method of claim 12, wherein the outputting the visual indicator comprises displaying the visual indicator on a windshield of the vehicle.

14. The drive mode selection method of claim 12, wherein the outputting the visual indicator comprises displaying the visual indicator in a heads up display worn by an operator of the vehicle.

15. The drive mode selection method of claim 12, wherein the providing the recommendation comprises outputting an auditory indicator that indicates the recommendation.

16. The drive mode selection method of claim 12, further comprises outputting an indicator associated with the second drive mode after the changing the operation of the vehicle from the first drive mode to the second drive mode.

17. A system that displays a drive mode of a vehicle, comprising:
    a mode indication component that displays a first visual indicator and a second visual indicator that provide respective indications of a current drive mode of the vehicle; and
    a mode recommendation component that provides a recommendation to change drive modes based on a determination that the current drive mode should be changed to another drive mode, wherein the determination is based on data received from a sensor and the current drive mode,
    wherein the mode recommendation component displays a third visual indicator associated with the recommendation of the other drive mode.

18. The system of claim 17, wherein the mode recommendation component outputs an auditory indicator associated with the recommendation of the other drive mode.

* * * * *